(12) United States Patent
Naito et al.

(10) Patent No.: US 9,260,034 B2
(45) Date of Patent: Feb. 16, 2016

(54) FUEL CELL POWER PLANT PROVIDED IN VEHICLE

(71) Applicant: HONDA MOTOR CO., LTD., Tokyo (JP)

(72) Inventors: Hideharu Naito, Wako (JP); Narihiro Takagi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/054,830

(22) Filed: Oct. 16, 2013

(65) Prior Publication Data
US 2014/0110185 A1    Apr. 24, 2014

(30) Foreign Application Priority Data
Oct. 19, 2012 (JP) .................. 2012-231979

(51) Int. Cl.
  *B60L 11/18* (2006.01)
  *B60L 3/00* (2006.01)
  *H01M 8/24* (2006.01)
  *H01M 8/04* (2006.01)

(52) U.S. Cl.
  CPC .......... *B60L 11/1896* (2013.01); *B60L 3/0007* (2013.01); *B60L 11/1898* (2013.01); *H01M 8/04201* (2013.01); *H01M 8/2475* (2013.01); *H01M 2250/20* (2013.01); *Y02E 60/50* (2013.01); *Y02T 90/32* (2013.01); *Y02T 90/34* (2013.01)

(58) Field of Classification Search
  CPC . B60L 11/1896; B60L 11/1898; Y02T 90/34; Y02T 90/32; H01M 2250/20; H01M 8/2475; H01M 8/04201
  USPC ......................................................... 180/65.31
  See application file for complete search history.

(56) References Cited

U.S. PATENT DOCUMENTS

| | | | |
|---|---|---|---|
| 6,974,646 B2* | 12/2005 | Noetzel et al. | 429/425 |
| 2003/0070858 A1* | 4/2003 | Kondo | 180/291 |
| 2003/0108784 A1* | 6/2003 | Enjoji et al. | H01M 8/02 429/434 |
| 2007/0087241 A1* | 4/2007 | Mulvenna et al. | 429/26 |
| 2007/0215397 A1* | 9/2007 | Suzuki | 180/65.3 |

FOREIGN PATENT DOCUMENTS

| | | |
|---|---|---|
| JP | 2002-367637 | 12/2002 |
| JP | 2003-123779 | 4/2003 |

(Continued)

OTHER PUBLICATIONS

Japanese Office Action for corresponding JP Application No. 2012-231979, Mar. 11, 2015.

*Primary Examiner* — Brodie Follman
*Assistant Examiner* — Brian Cassidy
(74) *Attorney, Agent, or Firm* — Mori & Ward, LLP

(57) ABSTRACT

A fuel cell power plant provided in a vehicle includes a power plant unit, a frame including a front part of the vehicle, and an impact cushioning member having a protective space therein and surrounding the power plant unit. The power plant unit includes a fuel cell stack, a hydrogen supply device to supply hydrogen to the fuel cell stack to generate electric power, and a high-voltage device to receive and manage the electric power generated. A gap is provided between the power plant unit and the impact cushioning member so that the power plant unit moves in a case where a collision load is applied from an outside of the vehicle.

10 Claims, 5 Drawing Sheets

(56) References Cited

FOREIGN PATENT DOCUMENTS

| | | |
|---|---|---|
| JP | 2003-267063 | 9/2003 |
| JP | 2006-302574 | 11/2006 |
| JP | 2011-228181 | 11/2011 |

* cited by examiner ion No. 2012-231979, filed
FUEL CELL POWER PLANT PROVIDED IN VEHICLE

CROSS REFERENCES TO RELATED APPLICATIONS

The present application claims priority under 35 U.S.C. §119 to Japanese Patent Application No. 2012-231979, filed Oct. 19, 2012, entitled "Fuel Cell Power Plant Provided In Vehicle." The contents of this application are incorporated herein by reference in their entirety.

BACKGROUND

1. Field

The present disclosure relates to a fuel cell power plant provided in a vehicle.

2. Description of the Related Art

Fuel cell vehicles are known in which a fuel cell and a drive motor are housed in a motor room provided in a front part of a vehicle body and which are driven by driving the drive motor by electric energy generated by the fuel cell.

For this type of fuel cell vehicle, technologies have been developed for protecting a power plant unit including the fuel cell from a collision load applied to the vehicle body in case of collision.

As an example of such a technology, Japanese Unexamined Patent Application Publication No. 2003-123779 discloses a structure in which a fuel cell is disposed in a rear section (cabin-side section) of a motor room and a partition wall is provided to cover the fuel cell from the front.

In addition, Japanese Unexamined Patent Application Publication No. 2003-267063 discloses a technology in which a strong structure is disposed in front of a fuel cell in a motor room, so that an impact load applied from the front is transmitted to a strut tower through the structure and transmission of the impact load to the fuel cell is suppressed.

SUMMARY

According to an aspect of the present disclosure, a fuel cell power plant provided in a vehicle includes a power plant unit, a frame including a front part of the vehicle, and an impact cushioning member having a protective space therein and surrounding the power plant unit. The power plant unit includes a fuel cell stack, a hydrogen supply device to supply hydrogen to the fuel cell stack to generate electric power, and a high-voltage device to receive and manage the electric power generated. A gap is provided between the power plant unit and the impact cushioning member so that the power plant unit moves in a case where a collision load is applied from an outside of the vehicle.

DESCRIPTION OF THE EMBODIMENTS

An embodiment of the present disclosure will be described with reference to the drawings.

Fuel Cell System

Figure 1:
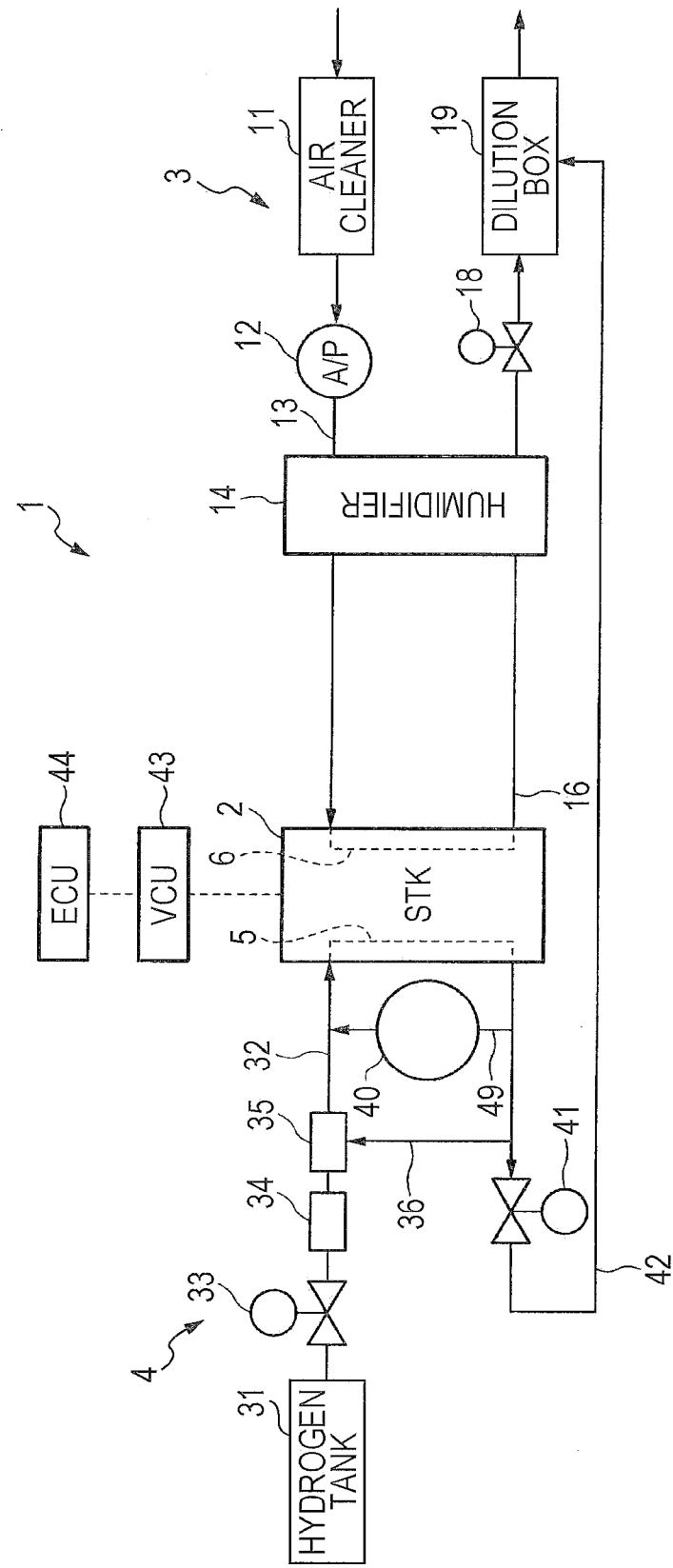
FIG. 1 is a schematic diagram of a fuel cell system.

First, a fuel cell system mounted in a fuel cell vehicle will be described. FIG. 1 is a schematic diagram of a fuel cell system 1.

Referring to FIG. 1, the fuel cell system 1 basically includes a fuel cell stack 2 (hereinafter referred to as a fuel cell 2); a cathode gas supplier 3 that supplies air, which is a cathode gas, to the fuel cell 2; and an anode gas supplier 4 that supplies hydrogen, which is an anode gas, to the fuel cell 2.

The fuel cell 2 is of a type that generates electric power as a result of an electrochemical reaction of reactant gases, and includes a layered body and a pair of end plates that sandwich the layered body. The layered body is formed by stacking a plurality of cells together, each cell being formed by sandwiching a solid polymer electrolyte membrane, such as a solid polymer ion-exchange membrane, between an anode and a cathode. When hydrogen is supplied to an anode flow path 5 that faces the anodes and air is supplied to a cathode flow path 6 that faces the cathodes, hydrogen ions are generated by a catalytic reaction at the anodes and travel through the solid polymer electrolyte membranes to the cathodes, where an electrochemical reaction occurs between the hydrogen ions and the air. Thus, the fuel cell 2 generates electricity.

The fuel cell 2 is connected to a drive motor 72 (see FIG. 3), which will be described below, a high-voltage battery (not shown), and various accessory devices, so that the electric power generated by the fuel cell 2 can be charged into the high-voltage battery or supplied to the drive motor 72 or the accessory devices. When the amount of electricity generated by the fuel cell 2 is not sufficient, the drive motor 72 can be driven by causing the high-voltage battery to compensate for the shortfall.

The air to be supplied to the fuel cell 2 is caused to pass through an air cleaner 11 so that impurities are removed from the air, and is then pressurized to a predetermined pressure by an air compressor 12. Then, the air flows through a cathode gas supply path 13 and is supplied to the cathode flow path 6 through a humidifier 14. The cathode gas supplied to the fuel cell 2 is used to generate electricity. Then, cathode offgas flows through a cathode offgas flow path 16 together with water generated at the cathode side, and is discharged to the dilution box 19 through the humidifier 14 and a pressure control valve 18.

The above-described humidifier 14 is connected to both the cathode gas supply path 13 and the cathode offgas flow path 16, and humidifies the cathode gas by moving moisture contained in the cathode offgas to the cathode gas through a plurality of hollow fiber membranes contained therein.

The hydrogen to be supplied to the fuel cell 2 is fed from the hydrogen tank 31. The hydrogen flows through the anode gas supply path 32 and is supplied to the anode flow path 5 of the fuel cell 2 through the shutoff valve 33, the injector 34, and the ejector 35. The hydrogen that has not been subjected to the reaction and consumed in the fuel cell 2 is discharged from the fuel cell 2 as anode offgas, and is introduced into the ejector 35 through an anode offgas flow path 36. The anode offgas is mixed with fresh hydrogen fed from the hydrogen tank 31, and is supplied to the anode flow path 5 of the fuel cell 2 again. Thus, the anode offgas discharged from the fuel cell 2 circulates and returns to the fuel cell 2 through the anode offgas flow path 36, the ejector 35, and the anode gas supply path 32.

The anode gas supply path 32 is connected to the anode offgas flow path 36 at a location downstream of the ejector 35 by an anode offgas circulation flow path 49. The anode offgas circulation flow path 49 is provided with a hydrogen pump 40. The anode offgas discharged from the fuel cell 2 can be supplied to the anode gas supply path 32 again by driving the hydrogen pump 40. In the present embodiment, the hydrogen pump 40, the injector 34, the ejector 35, etc., included in the anode gas supplier 4 constitute a hydrogen supply device.

An anode offgas discharge flow path 42, which is provided with a purge valve 41, branches from the anode offgas flow path 36. The anode offgas discharged to the anode offgas discharge flow path 42 is discharged to the dilution box 19 through the purge valve 41. The anode offgas discharged to the dilution box 19 is diluted by the cathode offgas that flows into the dilution box 19 through the cathode offgas flow path 16, and is then discharged to the outside.

The operation of the fuel cell system 1 is controlled by a VCU (high-voltage unit) 43 and an ECU 44.

The VCU 43 is connected between the fuel cell 2 and the high-voltage battery, and receives and manages the electric power generated by the fuel cell 2 in accordance with commands output from the ECU 44. The ECU 44 detects a request for an output from the fuel cell 2 on the basis of a brake operation, an accelerator operation, etc., and controls the overall operation of the fuel cell 2 by controlling, for example, an amount of reactant gas to be supplied to the fuel cell 2 on the basis of the result of the detection.

Fuel Cell Vehicle

Figure 2:
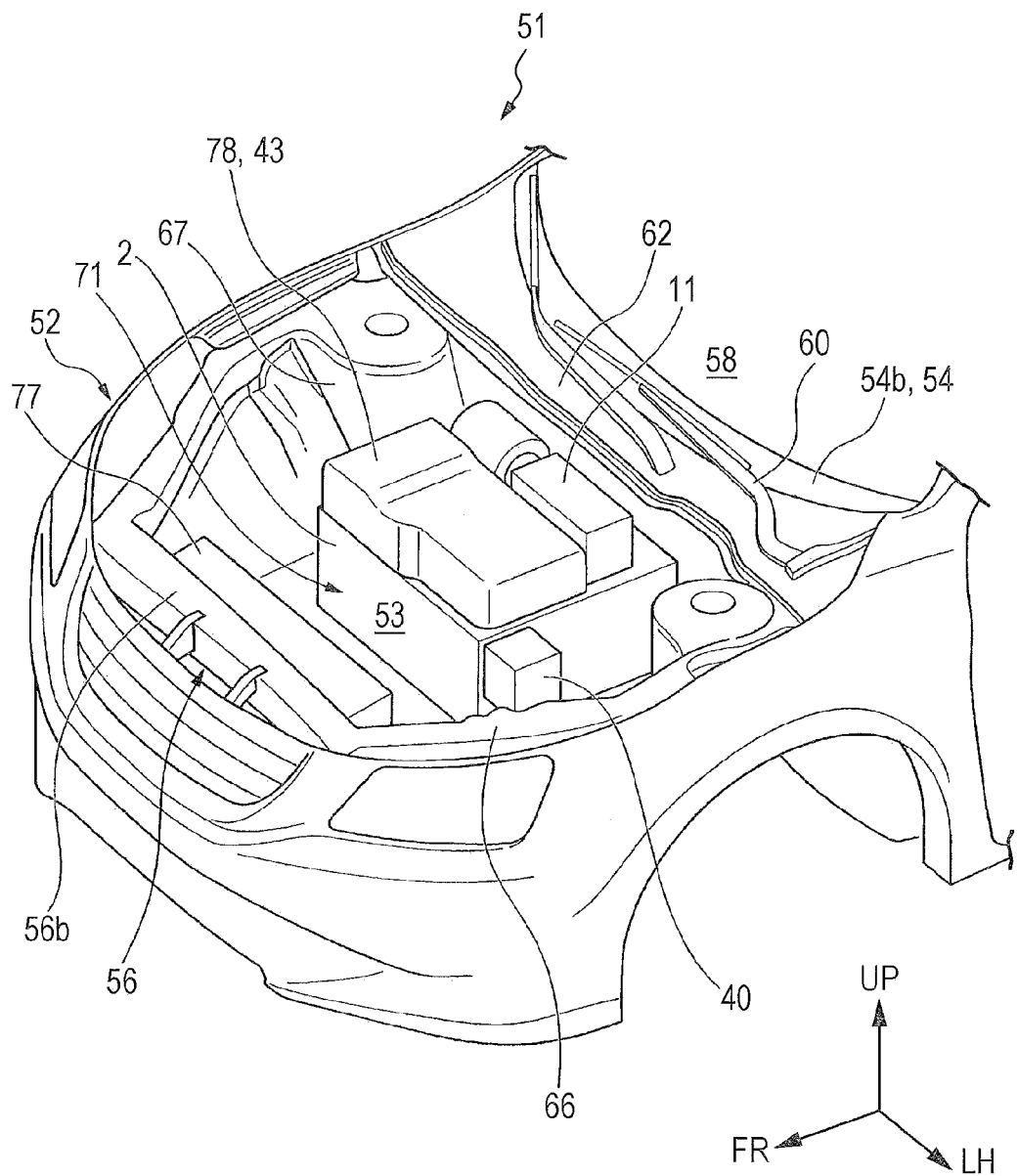
FIG. 2 is a perspective view of a front part of a fuel cell vehicle viewed from above.
Figure 3:
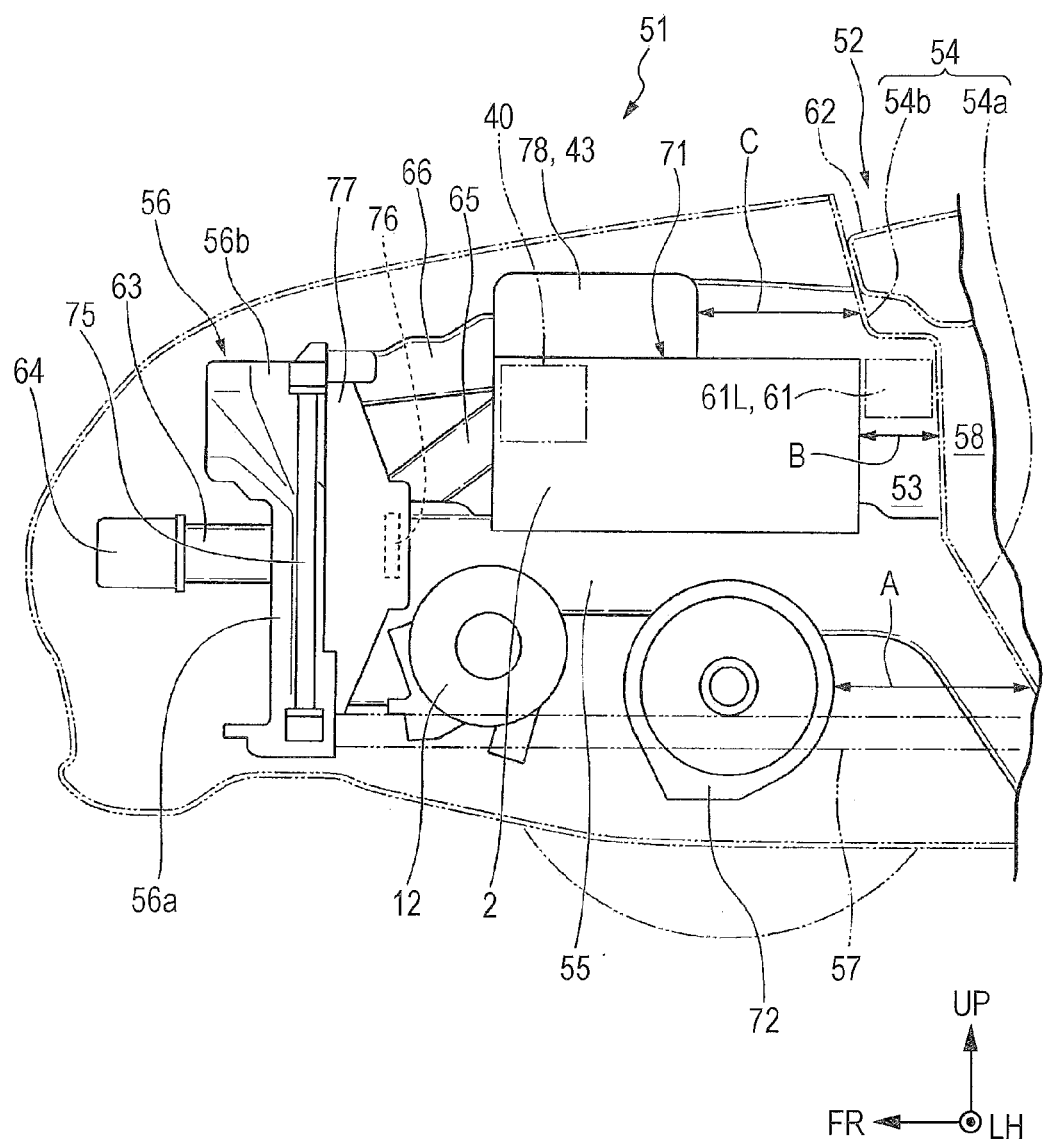
FIG. 3 is a schematic side view of the front part of the fuel cell vehicle.
Figure 4:
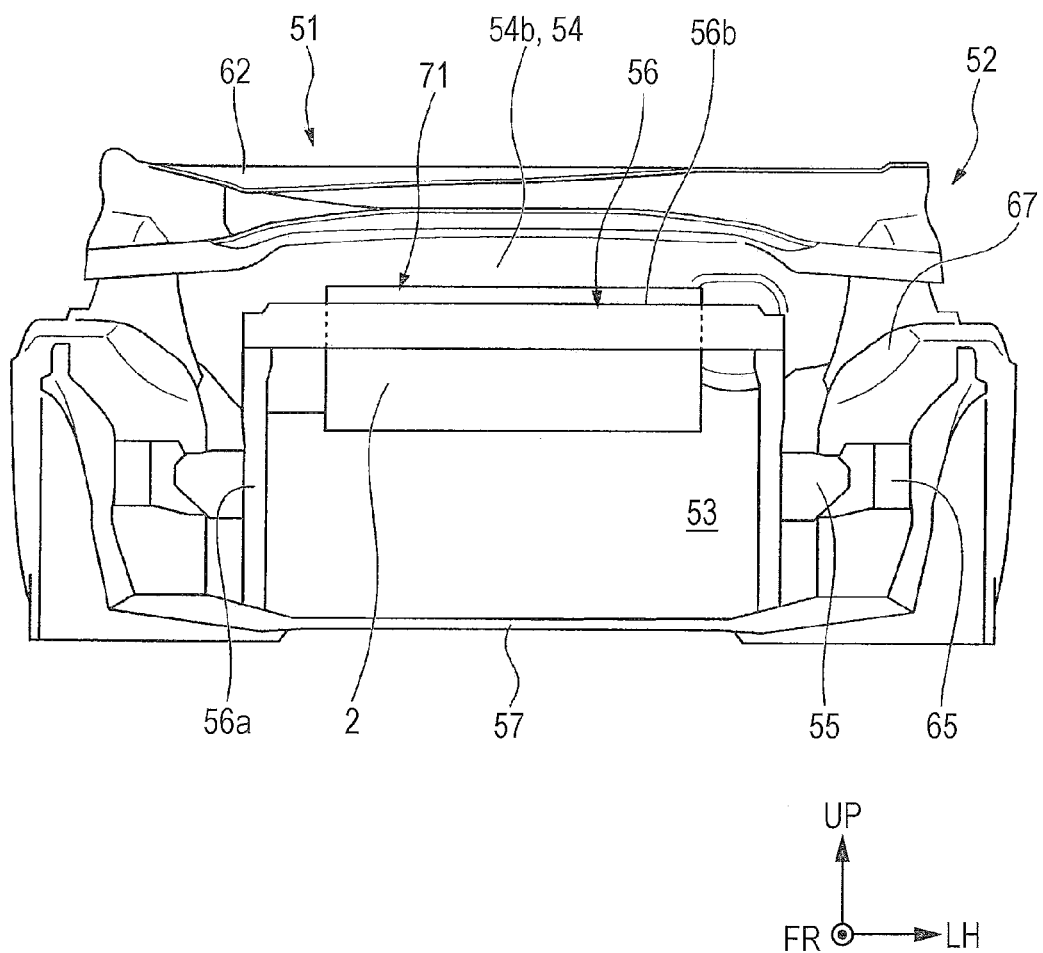
FIG. 4 is a schematic front view of the fuel cell vehicle.
Figure 5:
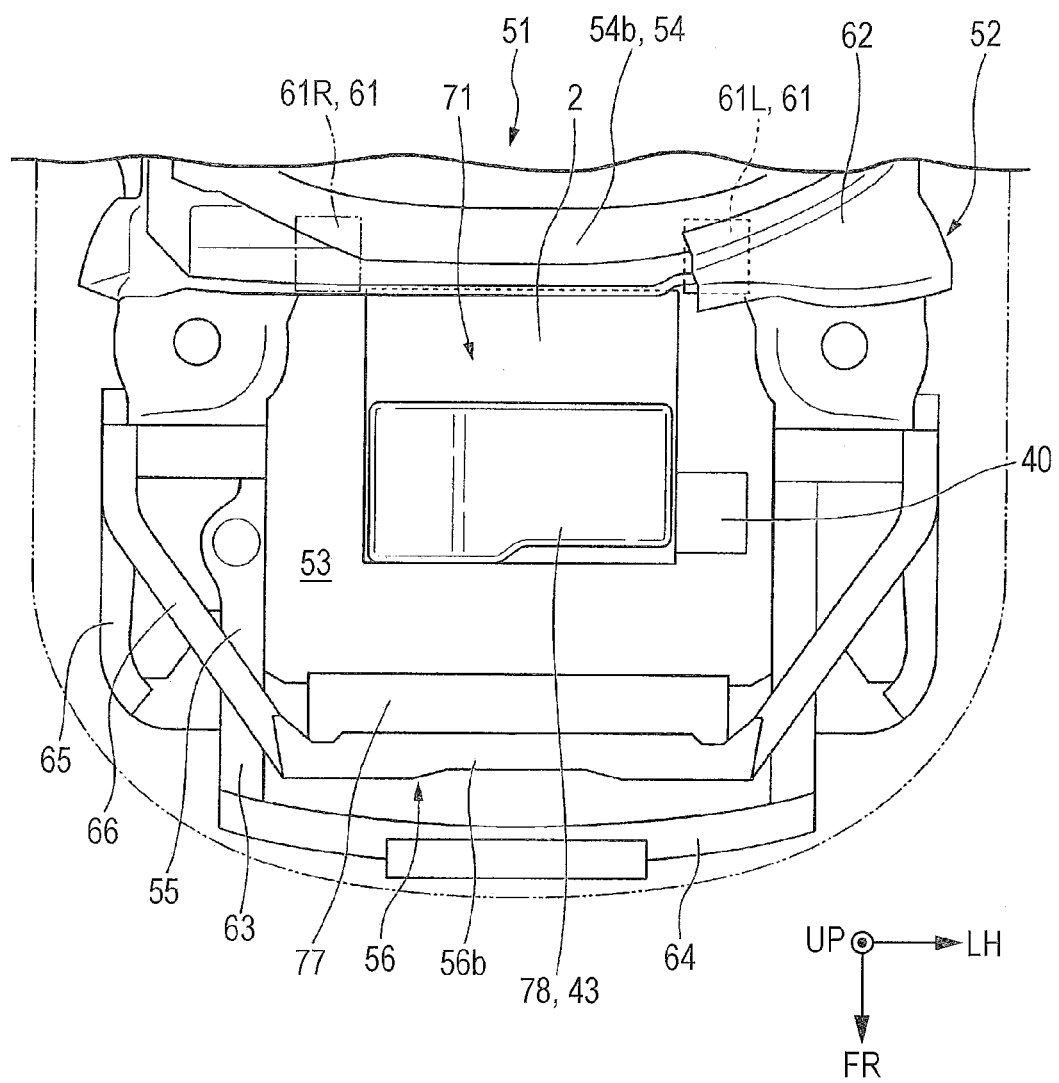
FIG. 5 is a schematic plan view of the front part of the fuel cell vehicle.

A fuel cell vehicle 51 in which the above-described fuel cell system 1 is mounted will now be described. FIG. 2 is a perspective view of a front part of the fuel cell vehicle 51 viewed from above. FIG. 3 is a schematic side view of the front part of the fuel cell vehicle 51. FIG. 4 is a schematic front view of the fuel cell vehicle 51. FIG. 5 is a schematic plan view of the front part of the fuel cell vehicle 51. In the drawings, the arrows FR, UP, and LH indicate the forward direction, the upward direction, and the leftward direction, respectively, of the fuel cell vehicle 51.

As illustrated in FIGS. 2 to 5, in the fuel cell vehicle 51 according to the present embodiment, a motor room (protective space) 53 having the shape of a frame in plan view is provided in a front part of a vehicle body 52. More specifically, the motor room 53 is defined by a dashboard 54 that serves as a rear frame, a pair of side frames 55 that serve as left and right frames, a bulkhead 56 that serves as a front frame, and a front sub-frame 57 that serves as a bottom frame in the vehicle body 52. The dashboard 54, the side frames 55, the bulkhead 56, and the front sub-frame 57 constitute an impact cushioning member according to the present embodiment.

Referring to FIG. 3, the dashboard 54 includes a dashboard lower member 54a that extends in the vertical direction and a dashboard upper member 54b that extends forward from the top end of the dashboard lower member 54a. The dashboard 54 separates a cabin 58 and the motor room 53 from each other of the front-rear direction.

A lower portion of the dashboard lower member 54a obliquely extends rearward and downward, and the bottom end thereof is connected to a floor panel (not shown). A brake operation simulator 61 (hereinafter referred to simply as a BOS 61) is fixed to the front surface of an upper portion of the dashboard lower member 54a. The BOS 61 is used to generate a reactive force when a brake pedal (not shown) is stepped on by a drive, and provides a predetermined relationship (stroke-force characteristics) between the amount by which the pedal is depressed (stroke, amount of operation) and the force applied to the pedal.

The fuel cell vehicle 51 according to the present embodiment may either be a left-hand-drive vehicle or a right-hand-drive vehicle. The BOS 61 is fixed to the front surface of the upper portion of the dashboard lower member 54a in a left or right region depending on whether the fuel cell vehicle 51 is a left-hand-drive vehicle or a right-hand-drive vehicle. In the following description, it is assumed that the fuel cell vehicle 51 is a left-hand-drive vehicle and a BOS 61L is fixed to the front surface of the upper portion of the dashboard lower member 54a in a left region. In the diagrams, reference numeral 61R denotes the position at which the BOS is fixed in the case where the fuel cell vehicle 51 is a right-hand-side vehicle.

A cowl top panel 62 is provided at the top end of the dashboard upper member 54b. The cowl top panel 62 extends in the left-right direction, and is inclined so as to extend rearward and upward. A wiper device 60 (see FIG. 2) is attached to the front surface of the cowl top panel 62. A windshield (not shown) that extends rearward and upward is attached to the rear end of the cowl top panel 62.

The side frames 55 extend along the left and right sides of the motor room 53 in the front-rear direction. The side frames 55 are curved upward from a region below a front portion of the cabin 58, and then extend forward. The rear end of each side frame 55 is bonded to a frame member (not shown), such as a floor frame or a side sill, disposed in a central region of the vehicle body 52 in the front-rear direction. Bumper beam extensions 63 extend forward from the front ends of the respective side frames 55, and a front bumper beam 64 is provided so as to connect the bumper beam extensions 63 to each other. A pair of lower members 65 that extend in the front-rear direction are disposed outside the side frames 55 in the left-right direction, and front ends of the lower members 65 are connected to the outer sides of front portions of the respective side frames 55 in the left-right direction.

The bulkhead 56 is formed in a rectangular frame shape and has an opening that extends therethrough in the front-rear direction. The bulkhead 56 connects the side frames 55 to each other at a position behind the front bumper beam 64. More specifically, the bulkhead 56 includes side stays 56a at both sides thereof in the left-right direction, and the side stays 56a are connected to the front portions of the respective side frames 55 at central regions thereof in the vertical direction.

An upper frame 56b, which is an upper portion of the bulkhead 56, extends in the left-right direction, and front ends of a pair of upper members 66 are connected to both ends of the upper frame 56b. The upper members 66 extend rearward and outward in the left-right direction, and then extend rearward. A pair of wheel housings 67, which extend upward and outward in the left-right direction, are provided between the side frames 55 and the respective upper members 66.

The front sub-frame 57 is platform-shaped (frame-shaped) in plan view and is disposed so as to cover the motor room 53 from below. The front sub-frame 57 supports a power plant unit 71, which will be described below, with a mounting member (not shown) or the like provided therebetween. Both ends of the front sub-frame 57 in the left-right direction, for example, are connected to the respective side frames 55.

The drive motor 72, the fuel cell 2, and the VCU 43 are stacked in the motor room 53, which has the above-described structure, in that order from the bottom.

The drive motor 72 has a cylindrical shape, and is supported by the above-described front sub-frame 57 with a mounting member (not shown) provided therebetween in such a manner that a rotation axis of the drive motor 72 extends in the left-right direction. The above-described air compressor 12 (see FIG. 3) is disposed in front of the drive motor 72.

The fuel cell 2 has the shape of a rectangular box that extends in the left-right direction, and is disposed substantially horizontally in the motor room 53. More specifically, the fuel cell 2 includes a layered body in which cells (not shown) are stacked together along the left-right direction, and the layered body is sandwiched by a pair of end plates (not shown). The fuel cell 2 is disposed above the above-described side frames 55 and inside the positions at which the above-described BOSs 61L and 61R are fixed (positions at which the BOS 61 is fixed depending on whether the fuel cell vehicle 51 is a left-hand-drive vehicle or a right-hand-drive vehicle) in the left-right direction. The fuel cell 2 is disposed so as to overlap the upper frame 56b of the above-described bulkhead 56 in the front view of FIG. 4.

As illustrated in FIG. 5, the above-described hydrogen pump 40 is disposed at one side of the fuel cell 2 in the left-right direction (left side in FIG. 5) and near a front portion of the fuel cell 2. The hydrogen pump 40 opposes the above-described left BOS 61L with a gap provided therebetween in the front-rear direction.

A radiator 75 is disposed in front of the fuel cell 2 in the motor room 53. The radiator 75 cools cooling water that circulates through the fuel cell 2, the drive motor 72, the VCU 43, etc., by providing a heat exchange between the outside air, which flows into the motor room 53 when the vehicle travels, and the cooling water. A cooling fan 76 and a fan shroud 77 that covers a space between the radiator 75 and the cooling fan 76 are disposed behind the radiator 75.

The VCU 43 includes a casing 78 that extends in the left-right direction and a DC-DC converter, for example, contained in the casing 78. The VCU 43 (casing 78) is attached to the top surface of the front portion of the fuel cell 2, and is disposed in front of the above-described dashboard upper member 54b. The rear surface of the VCU 43 is located in front of the rear surface of the fuel cell 2. The front surfaces of the dashboard upper member 54b and the dashboard lower member 54a are shaped so as to follow the rear surfaces of the fuel cell 2 and the VCU 43. The above-described air cleaner 11 is disposed behind the VCU 43.

The fuel cell 2, the VCU 43, the hydrogen supply device including the hydrogen pump 40, and the drive motor 72 constitute the power plant unit (vehicle-mounted fuel cell power plant) 71 of the fuel cell vehicle 51. The power plant unit 71 is located above the front sub-frame 57 and surrounded by the impact cushioning member constituted by the dashboard 54, the side frames 55, and the bulkhead 56. More specifically, the power plant unit 71 is separated from the dashboard 54, the side frames 55, the bulkhead 56, and the front sub-frame 57 by gaps, and is moved within these gaps when a collision load is applied to the vehicle body.

Here, when the distance between the drive motor 72 and the dashboard 54 (dashboard lower member 54a), the distance between the fuel cell 2 and the dashboard lower member 54a, and the distance between the VCU 43 and the dashboard upper member 54b in the front-rear direction are A, B, and C, respectively, A is the longest distance and B is the shortest distance (A>C>B).

A component of the above-described power plant unit 71 having the lowest strength and rigidity (hereinafter referred to as a shock resistance) is located inward from a component having a high shock resistance in the motor room 53. In the present embodiment, the fuel cell 2 is disposed at the innermost position in the motor room 53, and the VCU 43, the hydrogen pump 40, and the drive motor 72 are arranged around the fuel cell 2.

The manner in which the components are moved in the motor room 53 when a certain impact load is applied to the fuel cell vehicle 51 in case of collision will now be described.

In the following description, a case of a front collision will be mainly explained.

In the fuel cell vehicle 51 according to the present embodiment, a collision load applied to the front bumper beam 64 in case of a front collision is transmitted to the bumper beam extensions 63, so that the bumper beam extensions 63 collapse to absorb the impact load. The bulkhead 56 and the side frames 55, which are frames of the vehicle body 52, have rigidities higher than that of the bumper beam extensions 63, and are not easily deformed even if the impact load is transmitted to the bulkhead 56 and the side frames 55. The front sub-frame 57 has a rigidity higher than those of the above-described bumper beam extensions 63 and other components. Therefore, when the impact load is transmitted to the front sub-frame 57 through the side frames 55 and other components, the front sub-frame 57 is not deformed by the collision load but is moved rearward relative to the side frames 55 and the bulkhead 56. Accordingly, the power plant unit 71, which is disposed above the front sub-frame 57, moves rearward together with the front sub-frame 57.

In this case, the front sub-frame 57 and the power plant unit 71 are moved within the distances A to C between the dashboard 54 (the dashboard lower member 54a and the dashboard upper member 54b) and the power plant unit 71, so that the impact load is absorbed.

In case of, for example, a left side collision or a right side collision of the fuel cell vehicle 51, when a collision load is applied to the lower member 65 and the upper member 66 that are disposed outside the side frame 55 at one side in the left-right direction, the lower member 65 and the upper member 66 are deformed toward the other side in the left-right direction to absorb the impact load. When the impact load is transmitted to the front sub-frame 57 through the side frame 55 and other components, the front sub-frame 57 is moved toward the other side in the left-right direction together with the power plant unit 71 relative to the side frame 55.

Also in this case, the power plant unit 71 is moved within the gap between the side frames 55 to absorb the impact load.

Thus, according to the present embodiment, the power plant unit 71 is disposed in the impact cushioning member, which defines the motor room 53 of the fuel cell vehicle 51, with a gap provided between the power plant unit 71 and the impact cushioning member. When a certain impact load is applied, the power plant unit 71 is moved within the gap between the power plant unit 71 and the impact cushioning member. Therefore, the impact load can be efficiently absorbed and the power plant unit 71 can be reliably protected. In the present embodiment, the front, rear, left, and right sides of the power plant unit 71 are surrounded by the impact cushioning member, so that the power plant unit 71 can be protected from an impact load applied to any of the front, rear, left, and right sides of the vehicle. If an impact load greater than a certain impact load is applied from the outside, the power plant unit 71 is moved while being in contact with the impact cushioning member. However, interference between the power plant unit 71 and the impact cushioning member can be made as small as possible.

In the present embodiment, the power plant unit 71 is disposed in the impact cushioning member that serves as a frame that defines the motor room 53. Therefore, unlike the structure of the related art in which an additional component is provided to reduce the impact load applied to the power plant unit 71, the number of components is not increased and the freedom of layout is not reduced.

In addition, since the front surface of the dashboard 54 is shaped so as to follow the rear surfaces of the fuel cell 2 and the VCU 43, the freedom of layout can be increased, and the fuel cell 2 and the VCU 43 can be sufficiently separated from the dashboard 54 and suppressed from interfering with the dashboard 54 when an impact load is applied.

In addition, since a component of the power plant unit 71 having a low shock resistance (the fuel cell 2) is located inward from a component having a high shock resistance in the motor room 53, transmission of the impact load to the fuel cell 2 is suppressed and the fuel cell 2 can be reliably protected.

In addition, the hydrogen pump 40 is disposed at one side of the fuel cell 2 in the left-right direction and near the front portion of the fuel cell 2. Therefore, a space can be provided behind the hydrogen pump 40 in the motor room 53, and the freedom of layout can be increased. In addition, interference between the hydrogen pump 40 and a component (for example, the BUS 61) disposed behind the hydrogen pump 40 can be suppressed when a certain impact load is applied. Accordingly, even when the position of the fuel cell 2 in the left-right direction is restricted so that, for example, the fuel cell 2 can be applied to both a left-hand-side vehicle and a right-hand-side vehicle, interference between the hydrogen pump 40 and the BOS 61 can be suppressed.

The technical scope of the present disclosure is not limited to the above-described embodiment, and includes various modifications of the above-described embodiment within the scope of the gist of the present disclosure. The structures according to the above-described embodiment are merely examples, and may be modified as appropriate.

For example, although the front, rear, left, right, and bottom sides of the power plant unit 71 are surrounded by the dashboard 54, the side frames 55, the bulkhead 56, and the front sub-frame 57 in the above-described embodiment, the present disclosure is not limited to this as long as the front, rear, left, and right sides of the power plant unit 71 are surrounded by an impact cushioning member that serves as a frame of a front part of the vehicle body. In addition, the design of the gap between the power plant unit 71 and the impact cushioning member may be changed as appropriate.

Although the case in which the rear surface of the VCU 43 is in front of the rear surface of the fuel cell 2 is described above, the rear surfaces of the fuel cell 2 and the VCU 43 may instead be flush with each other.

Although the fuel cell 2 is described as a component of the power plant unit having a low shock resistance in the above-described embodiment, such a component is not limited to the fuel cell 2.

Although the case in which the BUS 61L is disposed on the front surface of the upper portion of the dashboard lower member 54a in the left region is described above, the BOS 61R may instead be arranged in the right region.

The components according to the above-described embodiment may be replaced by well-known components as appropriate within the scope of the gist of the present disclosure.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel cell power plant provided in a vehicle, comprising:
   a power plant unit comprising:
      a fuel cell stack;
      a hydrogen supply device including a hydrogen pump to supply hydrogen to the fuel cell stack to generate electric power, the hydrogen supply device forming a high shock resistance component; and
      a high-voltage device to receive and manage the electric power generated;
   a frame including a front part of the vehicle;
   an impact cushioning member having a protective space therein and surrounding the power plant unit; and
   a gap provided between the power plant unit and the impact cushioning member so that the power plant unit moves in a case where a collision load is applied from an outside of the vehicle,
   wherein the fuel cell stack includes front and rear sides which extend in planes extending substantially in a vehicle width direction,
   wherein the hydrogen pump is disposed between the planes formed by the front and rear sides of the fuel cell stack, and
   wherein the fuel cell stack has a low shock resistance and is located inward with respect to the high shock resistance component in the protective space.

2. The fuel cell power plant according to claim 1, wherein the impact cushioning member comprises
   a dashboard that defines a rear portion of the protective space;
   a pair of side frames that define side portions of the protective space;
   a bulkhead that defines a front portion of the protective space; and
   a front sub-frame that defines a bottom portion of the protective space.

3. The fuel cell power plant according to claim 2, wherein a front surface of the dashboard is shaped so as to follow rear surfaces of the fuel cell stack and the high-voltage device when viewed in the vehicle width direction.

4. The fuel cell power plant according to claim 1,
   wherein the hydrogen pump is disposed in a vicinity of a front portion of the fuel cell stack.

5. The fuel cell power plant according to claim 1, wherein the power plant unit comprises front, rear, left, and right sides which are surrounded by the impact cushioning member.

6. The fuel cell power plant according to claim 1, wherein the fuel cell stack longitudinally extends in a vehicle lengthwise direction.

7. The fuel cell power plant according to claim 1,
   wherein the fuel cell stack further includes top and bottom sides which extend in planes extending substantially perpendicular to the front and rear sides, and
   wherein the hydrogen pump is disposed between the planes formed by the top and bottom sides of the fuel cell stack.

8. The fuel cell power plant according to claim 1,
   wherein the high-voltage device forms a second high shock resistance component.

9. The fuel cell power plant according to claim 1, further comprising a drive motor located below the fuel cell stack.

10. The fuel cell power plant according to claim 9, wherein the high-voltage device is located above the fuel cell stack.

* * * * *